April 27, 1948.                     C. B. GASH                    2,440,541
      BOX HAVING A DRAWER AND A COVER AND INTERCONNECTED
              LATCHING AND LOCKING MEANS THEREFOR
                       Filed Aug. 26, 1944
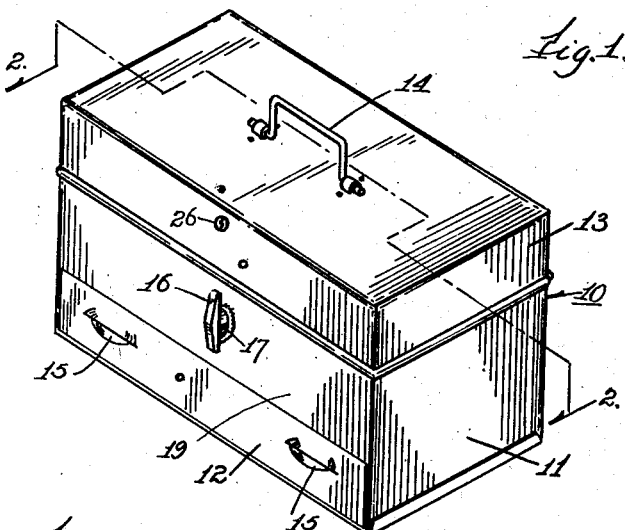
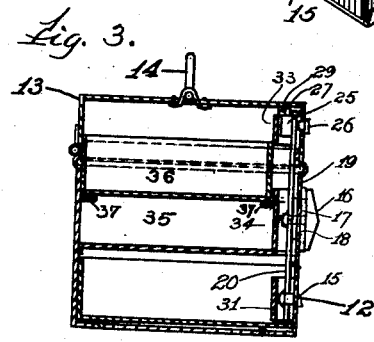
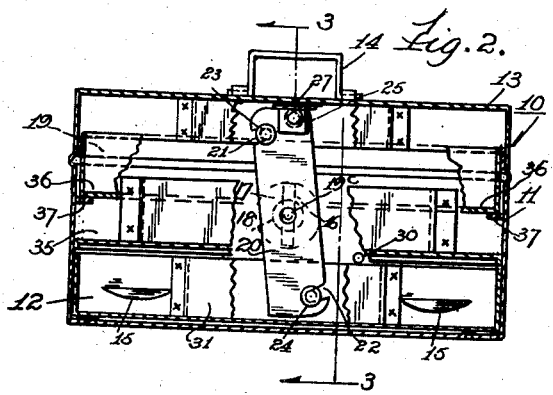
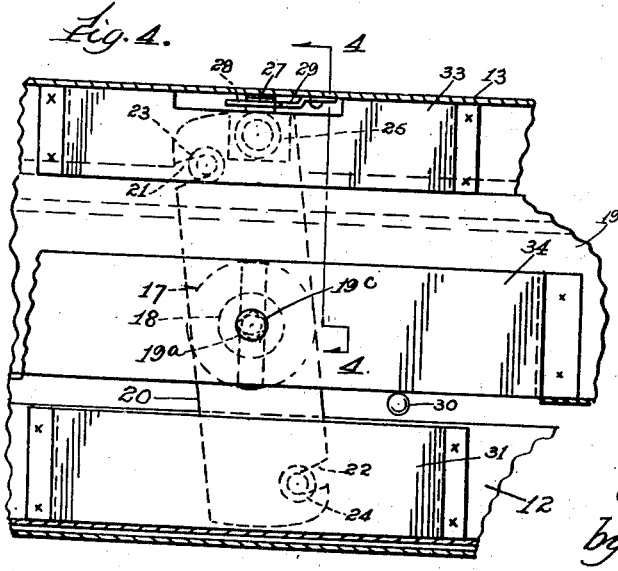
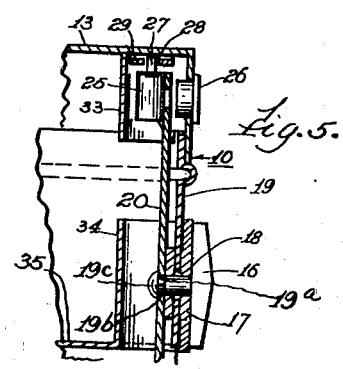
Inventor:
Charles B. Gash.
by Joshua R. H. Lipps
His Attorney.

Patented Apr. 27, 1948

2,440,541

UNITED STATES PATENT OFFICE 2,440,541

BOX HAVING A DRAWER AND A COVER AND INTERCONNECTED LATCHING AND LOCKING MEANS THEREFOR

Charles B. Gash, Oak Park, Ill.

Application August 26, 1944, Serial No. 551,371

5 Claims. (Cl. 312—193)

The present invention relates to fishing tackle and other boxes, and latches and locks therefor. It has particular reference to the provision of an improved box and improved latching and locking means for the box. Every fisherman is familiar with the habit of tackle boxes opening up and spilling all the contents, and not infrequently into the water.

One of the objects of this invention is to provide a box which will insure against any such thing happening. An advantage of the fishing tackle box of my invention is that it has a bottom drawer which opens by being pulled out horizontally at the front, and the box in its preferred form has a swinging latch whereby the drawer and the lid when closed may be latched, so that when the bottom drawer is latched, the lid also is latched and vice versa. The weight of the latch is applied off-center so as to prevent the latch from swinging accidentally to unlatched position when unlocked.

I, also, provide a lock which is preferably permanently attached to the latch, operated by a key which, when locked, prevents the swinging latch from turning out of its locked position.

Another object and advantage of my invention is the provision of such a construction which is easily assembled and inexpensive to construct.

Further objects and advantages will appear and be brought out more fully in the following specification, reference being had to the accompanying drawing, in which:

Fig. 1 is a perspective view of the box;

Fig. 2 is a vertical section, taken on the line 2—2 of Fig. 1;

Fig. 3 is a vertical section, taken on the line 3—3 of Fig. 1;

Fig. 4 is an enlarged detail of the swinging latch and lock; and

Fig. 5 is a detailed sectional view taken on the line 4—4 of Fig. 4.

Referring to the drawings in detail in which I have shown the preferred form utilizing the principles of my invention, a box 10 has a body portion 11, a drawer 12, and a lid 13 hinged to the body, having the usual handle 14. The drawer 12 may, also, be provided with handles 15, and opens by pulling the same outwardly to the front in a horizontal manner.

Another handle 16 is secured to a disk 17 extending through a cutout 18 in the front portion 19 of the body of the box, and mounted on a square post 19—a. This disk is located on its other side next to a swinging locking latch 20 which has a cutout 21 and another cutout 22 at diagonally opposite corners of the latch, in which pins 23 and 24, respectively, are adapted to be received, to limit the movement of the latch, as will be readily understood. The square post 19—a extends through a square hole 19—b and the latch 20 is retained on the post 19 by a head 19—c, so that the handle may turn the latch.

The latch 20 has mounted thereon a common lock 25. A key is adapted to be inserted in a keyhole 26 in the lid to operate a slidable bolt 27 of the lock 25. The bolt 27 is adapted to move into and out of a slot 28 in the clip 29 on the inside of the lid 13. I have, also, provided a stop pin 30 in the inside face of the body of the box which limits the swinging movement of the latch 20 to the left as viewed looking at the drawings in contradistinction to the pins 23 and 24 which limit the movement of the latch 20 to the right, as seen looking at the drawings.

I have, also, provided a housing 31 on the inside of the drawer which serves to separate the contents of the drawer from the working parts of the latch and may serve, also, to insure against the drawer opening when it is supposed to be in locked position.

It will be manifest from the foregoing that when the latch 20 is in the position shown in Fig. 4, the lid cannot be lifted because of the engagement of the latch with the pin 23. Also, the drawer cannot be pulled out because of the abutment of the head 32 of the pin 24 against the latch 20. With latch 20 in closed position the box can be carried even without using the key for lock 25. This in itself is one of the new features of the invention as, in addition, it eliminates the usual outside hardware such as clamps or latches—and will cut down the cost of manufacture. It will, also, be observed that I have provided another housing 33 for the lid to keep the contents away from the working parts.

The upper end of the latch 20 is longer than the lower end so that when the latch is in the position shown in Figs. 2 and 4, it will tend to remain in this position as the weight of the upper end of the latch is arranged in such a manner that the latch is over the center in the position shown in Figs. 2 and 4. There is also a housing 34 for the swinging locking latch 20. While the latch is in the last-mentioned position, it may be again locked by means of the key which will cause the bolt 27 to engage in the slot 28 in the clip of the lid. This will prevent handle 16 from being turned. A fortiori, the contents will be securely locked in this position also, In order to open the box, it is necessary not only to operate the key to remove the bolt from the slot 28, but also to take hold of the handle 16 and swing it in a counterclockwise manner until it reaches a horizontal position with the lower side of the upper part of the latch resting against the stop pin 30.

The portion of the box behind the housing 34 constitutes a false tray 35 and an actual tray 36 may rest on lugs 37 above false tray 35.

The operation of the device and its advantages should be manifest without further description.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A box open at the upper end and having an opening in a front wall thereof, a cover providing a closure for the upper end of the box, means hinging the cover to the box, a drawer positioned in the box and slidable through the opening in the front wall thereof, a latch element pivotally mounted on the front wall of the box with the upper end extending for engagement with the cover and the lower end for engagement with the drawer, said latch element locking the cover and drawer in their closed positions respectively, and positioned on the inside of the box and cover, and a handle on the outside of the box attached to the latch for operation thereof.

2. A box open at the upper end and having an opening in the lower part of a front wall thereof, a cover with vertical sides providing a closure for the upper end of the box, means hinging the cover to the box, a drawer positioned in the cover to the box, a drawer positioned in the lower part of the box and slidable through the opening in the front wall thereof, a latch element pivotally mounted on the front wall of the box with the upper end extending for engagement with the cover and the other for engagement with the drawer, said latch element locking the cover and drawer in their closed positions respectively, and a lock on the upper end of said latch adapted to cooperate with a slot in the cover and to prevent rotation of said latch.

3. A box open at the upper end and having an opening in the lower part of a front wall thereof, a cover with vertical sides providing a closure for the upper end of the box, means hinging the cover to the box, a drawer positioned in the lower part of the box and slidable through the opening in the front wall thereof, a latch element pivotally mounted on the front wall of the box with the upper end extending for engagement with the cover and the other for engagement with the drawer, said latch element locking the cover and drawer in their closed positions respectively, and a lock on the upper end of said latch adapted to cooperate with a slot in the cover, said latch positioned on the inside of the box and cover, and a handle on the outside of the box attached to the latch for operation thereof.

4. A box open at the upper end and having an opening in a front wall thereof, a cover providing a closure for the upper end of the box, means hinging the cover to the box, a second cover adapted to close the opening in said front wall, a latch element pivotally mounted on the inside of the front wall of the box with the upper end extending for engagement with a pin on the first-mentioned cover and the lower end extending for engagement with a pin on the second cover, said latch locking the said covers in their closed positions respectively, and a handle on the outside of the box attached to said latch for operation thereof.

5. A box open at the upper end and having an opening in the lower part of a front wall thereof, a cover with vertical sides providing a closure for the upper end of the box, means hinging the cover to the box, a drawer positioned in the lower part of the box and slidable through the opening in the front wall thereof, a latch element comprising a flat strip with cut out portions near the ends thereof and pivotally mounted on the front wall of the box with the upper end extending for engagement with a pin extending inwardly from the front of the cover and the other for engagement with a headed pin extending inwardly from the front of the drawer, said latch element locking the cover and drawer in their closed positions respectively, and a lock on the upper end of said latch adapted to cooperate with a slot in the cover, said latch positioned on the inside of the box and cover, and a handle on the outside of the box attached to the latch for operation thereof.

CHARLES B. GASH.

REFERENCES CITED

The following references are of record in the file of this patent:

UNITED STATES PATENTS

| Number | Name | Date |
|---|---|---|
| Re. 8,079 | Whitney | Feb. 12, 1878 |
| 123,074 | Andrews | Jan. 30, 1872 |
| 311,898 | Hull | Feb. 10, 1885 |
| 591,723 | Bannan | Oct. 12, 1897 |
| 834,462 | Faught | Oct. 20, 1906 |
| 836,648 | Nelson | Nov. 20, 1906 |
| 918,742 | Ferdon | Apr. 20, 1909 |
| 1,183,379 | Hick | May 16, 1916 |
| 1,368,048 | Pilliod | Feb. 8, 1921 |
| 2,286,427 | Levensten | June 16, 1942 |